(12) United States Patent
Lien et al.

(10) Patent No.: US 10,644,960 B2
(45) Date of Patent: May 5, 2020

(54) CALIBRATION METHOD AND WIRELESS COMMUNICATION DEVICE FOR ACHIEVING CHANNEL RECIPROCITY

(71) Applicant: Industrial Technology Research Institute, Hsinchu (TW)

(72) Inventors: Che-Ying Lien, Miaoli County (TW); Shang-Ho Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/854,635

(22) Filed: Dec. 26, 2017

(65) Prior Publication Data

US 2019/0132208 A1    May 2, 2019

Related U.S. Application Data

(60) Provisional application No. 62/578,663, filed on Oct. 30, 2017.

(30) Foreign Application Priority Data

Dec. 14, 2017 (TW) .............................. 106143935 A

(51) Int. Cl.
*H04L 12/24* (2006.01)
*H04W 24/08* (2009.01)
(Continued)

(52) U.S. Cl.
CPC ............. *H04L 41/12* (2013.01); *H04W 24/08* (2013.01); *H04B 7/0452* (2013.01); *H04W 88/08* (2013.01)

(58) Field of Classification Search
CPC ........ H04L 41/12; H04L 41/00; H04W 24/08; H04W 24/00; H04W 88/08; H04W 88/00;
(Continued)

(56) References Cited

U.S. PATENT DOCUMENTS 9,236,998 B2    1/2016    Wang et al.
9,391,745 B2    7/2016    Agee et al.
(Continued)

FOREIGN PATENT DOCUMENTS

CN       104980232 A      10/2015
WO    WO 2016/176626 A1    11/2016

OTHER PUBLICATIONS

Hao Wei, Reciprocity Calibration for Massive MIMO Systems by Mutual Coupling between Adjacent Antennas, IEEE 2016, (Year: 2016).*

(Continued)

*Primary Examiner* — Jeffrey M Rutkowski
*Assistant Examiner* — Luna Weissberger

(57) ABSTRACT

A calibration method for achieving channel reciprocity is provided. The method is used in a wireless communication device and includes: receiving environment information between a root node and each of a plurality of child nodes and between each of the child nodes and one of the other child nodes transmitted by the root node and the child nodes; obtaining evaluation parameters between each of the child nodes and the root node and between each of the child nodes and one of the other child nodes according to the environment information; determining links between the root node and the child nodes according to the evaluation parameters to form a first tree network topology; and obtaining calibration parameters according to the first tree network topology to calibrate reciprocity of the root node and the child nodes.

14 Claims, 15 Drawing Sheets

(51) Int. Cl.
*H04W 88/08* (2009.01)
*H04B 7/0452* (2017.01)

(58) Field of Classification Search
CPC ...... H04B 7/0452; H04B 7/0413; H04B 7/04; H04B 7/02
USPC .......................................................... 370/254
See application file for complete search history.

(56) References Cited

U.S. PATENT DOCUMENTS

| | | | |
|---|---|---|---|
| 2007/0091863 A1* | 4/2007 | Sampath ............ | H04W 72/1236 370/338 |
| 2008/0095221 A1 | 4/2008 | Picard | |
| 2009/0034434 A1* | 2/2009 | Tsang .................. | H04L 12/1854 370/256 |
| 2010/0067362 A1* | 3/2010 | Sakaguchi .......... | H04L 25/0206 370/203 |
| 2010/0150013 A1* | 6/2010 | Hara ................... | H04L 25/0224 370/252 |
| 2014/0160957 A1 | 6/2014 | Zheng et al. | |
| 2014/0348258 A1* | 11/2014 | Walton ................ | H04L 5/0048 375/267 |
| 2015/0222336 A1 | 8/2015 | Yilmaz et al. | |
| 2016/0142094 A1* | 5/2016 | Papadopoulos ........ | H04B 17/14 375/219 |
| 2016/0164647 A1* | 6/2016 | Agee ................... | H04B 7/0413 375/267 |
| 2016/0308624 A1 | 10/2016 | Rong et al. | |
| 2017/0331577 A1* | 11/2017 | Parkvall .............. | H04J 11/0079 |
| 2018/0324607 A1* | 11/2018 | Rengarajan .......... | H04W 24/02 |

OTHER PUBLICATIONS

Xiwen Jiang, How accurately should we calibrate a Massive MIMO TDD system?, IEEE 2016 (Year: 2016).*

Taiwan Patent Office, Office Action, Patent Application Serial No. 106143935, dated Aug. 10, 2018, Taiwan.

Zou et al., "Efficient Estimation and Compensation of Transceiver Non-Reciprocity in Precoded TDD Multi-User MIMO-OFDM Systems," 2014 IEEE 80th Vehicular Technology Conference (VTC Fall), Sep. 2014, 7 pages, IEEE, US.

Luo et al., "A new reciprocity calibration method for massive MIMO systems," 2016 IEEE International Symposium on Broadband Multimedia Systems and Broadcasting (BMSB), Jun. 2016, pp. 1-4, IEEE, US.

Liu et al., "An improved relative channel reciprocity calibration method in TDD massive MIMO systems," 2015 24th Wireless and Optical Communication Conference (WOCC), Oct. 2015, pp. 98-102, IEEE, US.

Wei et al., "Reciprocity Calibration for Massive MIMO Systems by Mutual Coupling between Adjacent Antennas," 2016 IEEE 83rd Vehicular Technology Conference (VTC Spring), May 2016, 5 pages, IEEE, US.

Jiang et al., "How accurately should we calibrate a Massive MIMO TDD system?" 2016 IEEE International Conference on Communications Workshops (ICC), May 2016, 6 pages, IEEE, US.

Vieira et al., "Reciprocity calibration methods for massive MIMO based on antenna coupling," Globecom 2014—Wireless Communication Symposium, Dec. 2014, pp. 3708-3712, IEEE, US.

* cited by examiner

Level 0
Level 1

CALIBRATION METHOD AND WIRELESS COMMUNICATION DEVICE FOR ACHIEVING CHANNEL RECIPROCITY

CROSS REFERENCE TO RELATED APPLICATIONS

The present application claims priority from U.S. Provisional Application filed on Oct. 30, 2017 in the United States Patent and Trademark Office and assigned Ser. Nos. 62/578, 663, and from Taiwan Patent Application No. 106143935, filed on Dec. 14, 2017, the entire disclosures of each of which are incorporated herein by reference.

BACKGROUND

Technical Field

The disclosure relates to the field of wireless communications technologies, and more particularly, it relates to a calibration method and a wireless communication device for supporting multiuser multiple input multiple output (MU-MIMO) communication operation and massive multiple input multiple output (M-MIMO) communication to achieve channel reciprocity.

Description of the Related Art

Channel reciprocity, i.e. characteristics of frequency symmetry for uplink/downlink, have a bright prospect of application in TDD (Time Division Duplex) system for LTE-A (Advanced-Long Term Evolution). The hypothesis of reciprocity of uplink/downlink is widely recognized in the industry, and is utilized to conduct channel estimation effectively. However, in practical application, due to the differences between the radio frequency (RF) circuits of receivers and those of transmitters, especially the receiver and transmitter on a base station side, it is difficult to maintain the assurance of reciprocity between uplink and downlink in the TDD system. For a system with a reciprocity between uplink and downlink based on TDD, system performance is sensitive to the tolerance between uplink and downlink channels, and even a little tolerance between the uplink and downlink channels might result in a most serious degradation of performance. Thus, reciprocity calibration of the TDD system has drawn the attention of the industry.

Currently, there are two main methods to solve the problem of a mismatch between the RF circuits. The first method is to estimate calibration parameters by using downlink channel information feedback transmitted from user equipments (UEs) before the base station sends downlink signals to the UEs. However, this method fails to achieve the goal of reducing channel estimation using the TDD system. The second method is to obtain calibration parameters by periodically performing a calibration between the base stations and use the calibration parameters to calibrate the reciprocity between the base stations.

However, there are a lot of problems in the prior art using the second method. For example, the calibration parameters are easily affected by the location of the base stations. Since the calculation of the calibration coefficients does not take into consideration the impact of different environment parameters, this results in large estimation error, high computation complexity, and so on.

Hence, it is necessary to develop a calibration method and a wireless communication device for achieving channel reciprocity, which may perform information exchange between base stations through pairing to achieve the purpose of channel reciprocity.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A calibration method and a wireless communication device for achieving channel reciprocity are provided in the disclosure.

In an embodiment, a calibration method for achieving channel reciprocity, used in a wireless communication device is provided in the disclosure. The method is used in a wireless communication device. The method comprises: receiving environment information between a root node and each of a plurality of child nodes and between each of the child nodes and one of the other child nodes transmitted by the root node and the child nodes; obtaining evaluation parameters between each of the child nodes and the root node and between each of the child nodes and one of the other child nodes according to the environment information; determining links between the root node and the child nodes according to the evaluation parameters to form a first tree network topology; and obtaining calibration parameters according to the first tree network topology to calibrate the reciprocity of the root node and the child nodes.

In some embodiments, the environment information at least comprises: transmission power, channel gain, noise variance and a number of pilot signals.

In some embodiments, the evaluation parameter $\Gamma_{i \to j}^2$ between a node i and a node j is expressed by the following equation:

$$\Gamma_{i \to j}^2 = \left| \frac{1}{p_{i \to j} \cdot b_{i \to j}} \right|^2 \cdot \frac{\sigma_{i \to j}^2}{N}$$

wherein $p_{i \to j}$ is the transmission power between the node i and the node $b_{i \to j}$ is the channel gain between the node i and the node j, $\sigma_{i \to j}^2$ is the noise variance between the node i and the node j and N is the number of pilot signals.

In some embodiments, the step of determining the links between the root node and the child nodes according to the evaluation parameters to form the first tree network topology further comprises: (a) obtaining the evaluation parameters between each of the child nodes and the root node when no link is formed, and selecting a node pair having a minimum evaluation parameter to form a link; and (b) when a link has been formed, obtaining the evaluation parameters between each child node not forming the link and the root node and accumulated evaluation parameters passing through the link between each child node not forming the link and the root node, and selecting a node pair with the minimum evaluation parameter from the evaluation parameters and the accumulated evaluation parameters to form a link; the step (B) is repeatedly performed until each of the child nodes forms the link with the root node or one of the child nodes.

In some embodiments, the root node and the child nodes support multiuser multiple input multiple output (MU-MIMO) communication.

In some embodiments, the root node and the child nodes are access points (APs).

In some embodiments, the root node and the child nodes support massive multiple input multiple output (M-MIMO) communication.

In some embodiments, the root node and the child nodes are antennas of an AP.

In some embodiments, the wireless communication device is one of the root node and the child nodes.

In some embodiments, the method further comprises: selecting either the root node or one of the child nodes as a first representative node of the first tree network topology; and determining links between the first representative node and a second representative node according to the environment information and the evaluation parameters between the first representative node and the second representative node of at least one second tree network topology to form an extension tree network topology.

In an embodiment, a wireless communication device for achieving channel reciprocity, comprising: a control circuit, a processor and a memory. The control circuit is installed in the control circuit. The memory is installed in the control circuit and operatively coupled to the processor. The processor is configured to execute program codes stored in the memory to: receive environment information between a root node and each of a plurality of child nodes and between each of the child nodes and each one of the other child nodes transmitted by the root node and the child nodes; obtain evaluation parameters between each of the child nodes and the root node and between each of the child nodes and each one of the other child nodes according to the environment information; determine links between the root node and the child nodes according to the evaluation parameters to form a first tree network topology; and obtain calibration parameters according to the first tree network topology to calibrate reciprocity of the root node and the child nodes.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION

Figure 1:
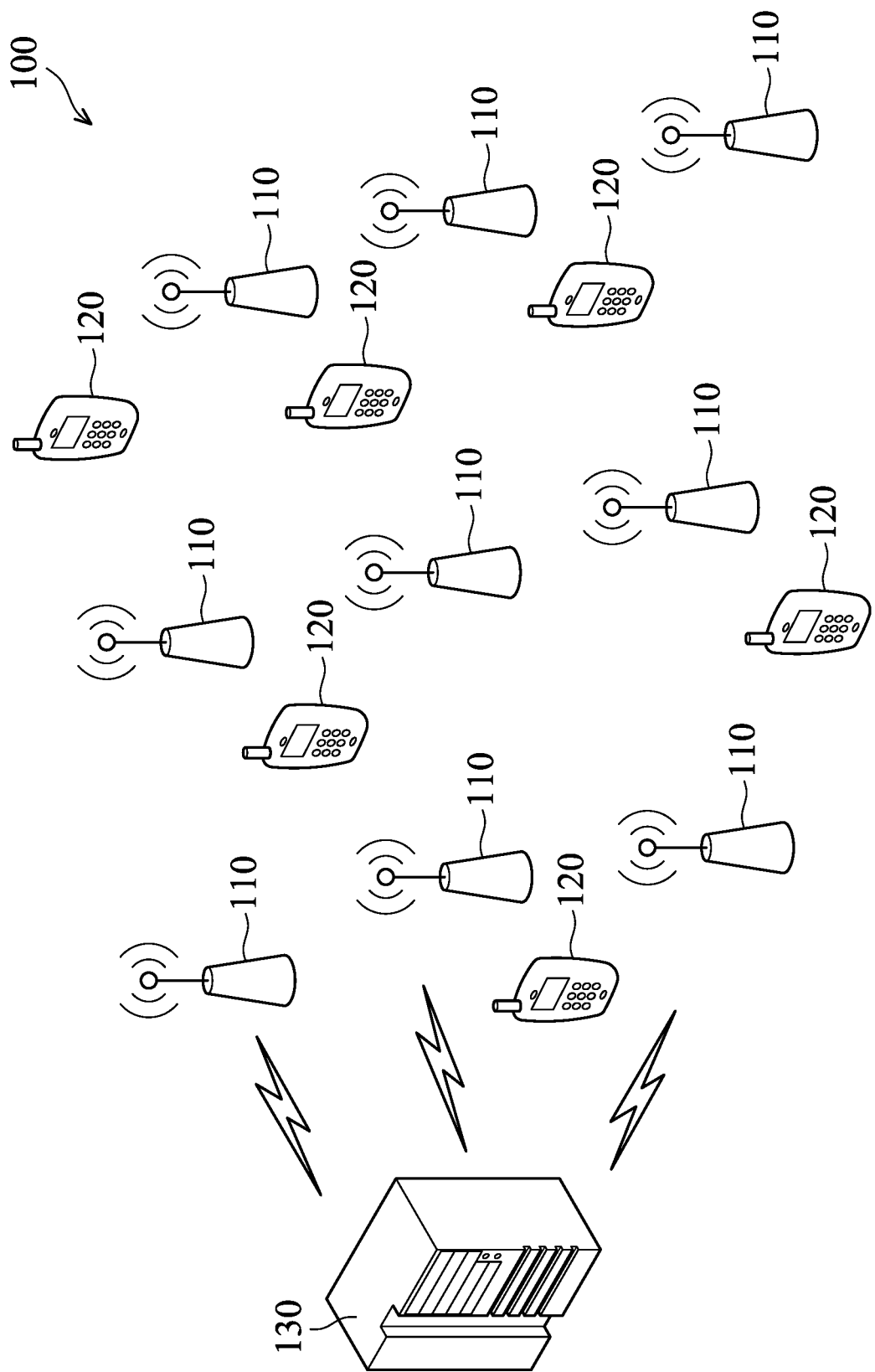
FIG. 1 shows a schematic diagram illustrating a MU MIMO communication system in accordance with an embodiment of the disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

The term "wireless" may be used to describe circuits, devices, systems, methods, techniques, communications channels, etc., by using modulated electromagnetic radiation through a non-solid medium. The term does not imply that the associated devices do not contain any wires. A wireless device may comprise at least one antenna, at least one radio, at least one memory, and at least one processor, where the radio transmits and receives signals through the antenna that represent data transmission, while the processor may process the data to be transmitted and the data that has been received. The processor may also process other data which is neither transmitted nor received.

As used within the disclosure, the term "access point (AP)" is intended to cover wireless communications devices that schedule and control, at least partially, other devices in the network. An access point may also be known as a base station (BS), evolved node B (eNodeB), or any other term that may arise to describe the functionality of a network controller.

As used within the disclosure, the term "user equipment (UE)" is intended to cover those wireless communications devices which are at least partially scheduled and controlled by the access point. A user equipment may also be known as a mobile device, mobile station (MS), station (STA), subscriber station (SS), access terminal, or any other term that may arise to describe the functionality of a mobile device. Mobile devices may move during such communications, but movement is not required.

FIG. 1 shows a schematic diagram illustrating a MU MIMO communication system 100 in accordance with an embodiment of the disclosure. As shown in FIG. 1, the communication system 100 may at least comprise nine APs 110 each having a single antenna and six UEs 120 each having a single antenna. In an embodiment, the number of APs 110 is greater than the number of UEs 120. It should be noted that although the numbers of APs 110 and UEs 120 in FIG. 1 used in this example are nine and six, they should not be limited in the disclosure.

The communication system 100 may further include a central server 130. The central server 130 may be any other electronic device capable of communicating with the APs 110 or the UEs 120 via a network, such as a computer, a server, or the like. The central server 130 may receive the information transmitted by the APs 110 to calibrate the channels between the APs 110. In an embodiment, the function performed by the central server 130 may also be performed by one of the APs 110.

Figure 2A:
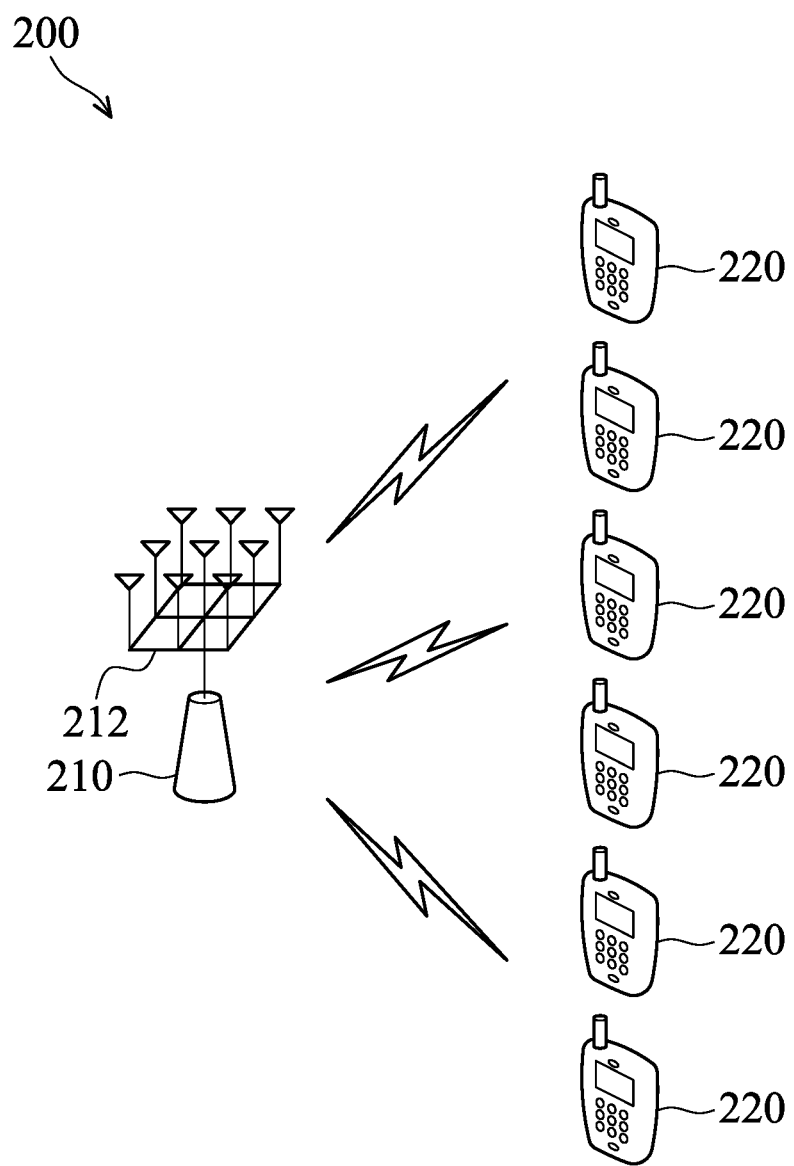
FIGS. 2A-2B are schematic diagrams illustrating of a massive MIMO (M-MIMO) communication system in accordance with an embodiment of the present disclosure.
Figure 2B:
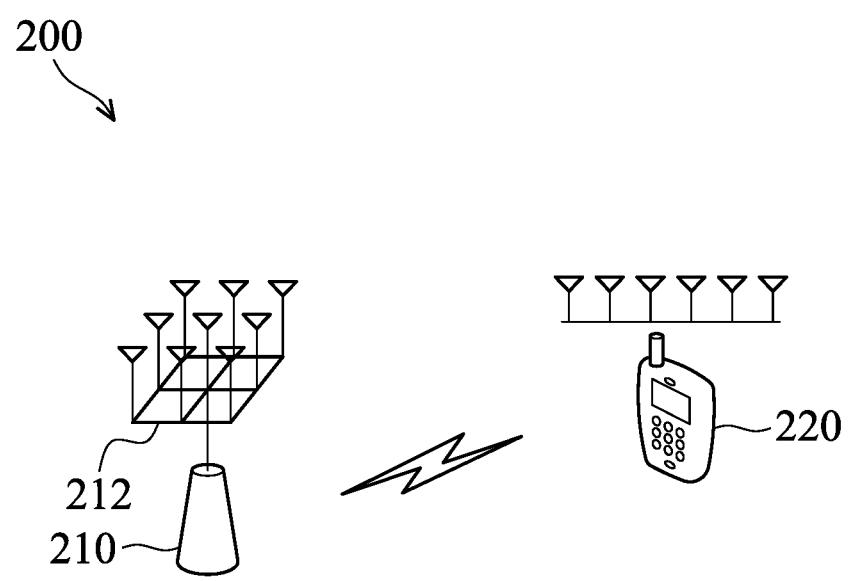

Reference is now made to FIG. 2A, which illustrates a schematic diagram of a massive MIMO (M-MIMO) communication system 200 in accordance with an embodiment of the present disclosure. The communication system 200 comprises an AP 210 and six UEs 220 each having a single antenna. The AP 210 may include a massive multiple input multiple output (M-MIMO) antenna array 212 comprised of a plurality of antennas. The number of antennas of the M-MIMO antenna array 212 may be significantly larger than the number of antennas used in existing AP implementations (which may up to 8 antenna elements). For example, the M-MIMO antenna array 212 can have 16, 32, 64 or more antennas. Of course, those skilled in the art could readily appreciate that six UEs 220 having a single antenna can be regarded as a UE having six antennas, as shown in FIG. 2B. This will not impact the calibration of the channel reciprocity.

Figure 3:
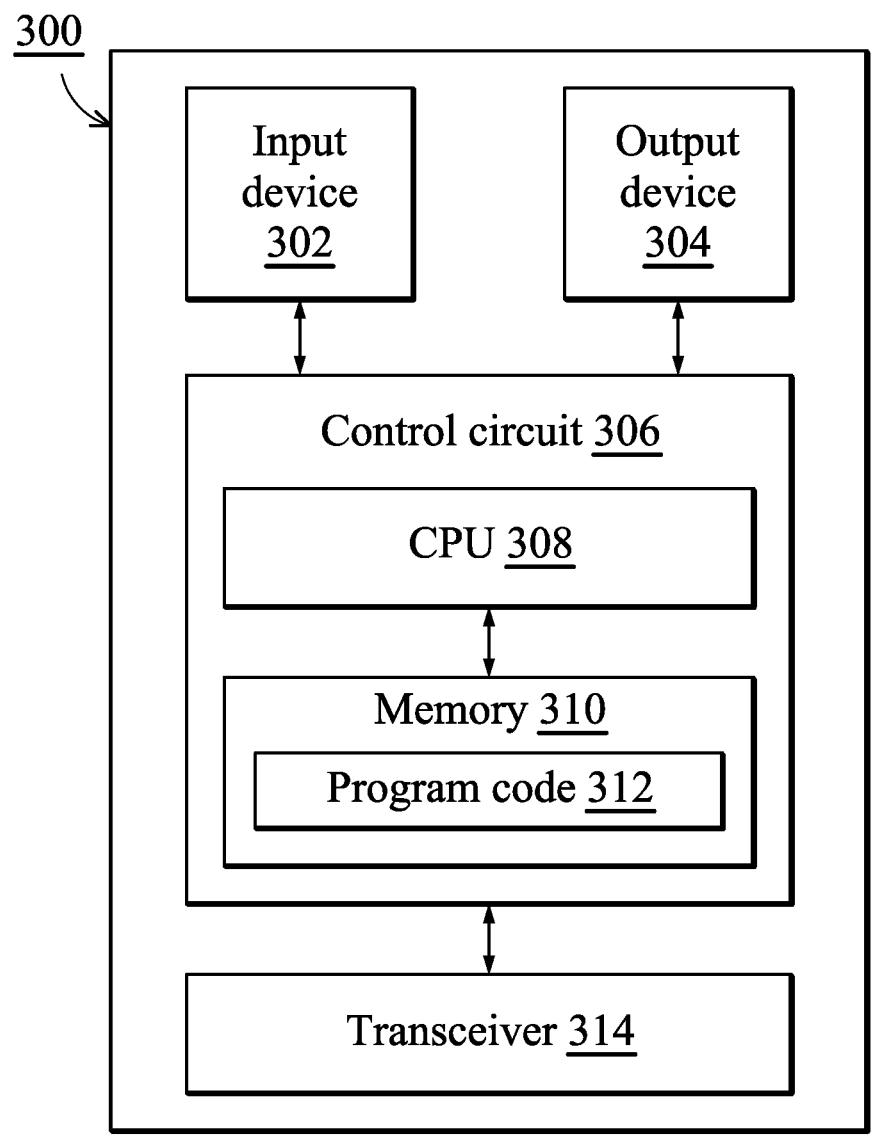
FIG. 3 shows an alternative simplified functional block diagram of a wireless communication device according to one embodiment of the present disclosure.

Next, turning to FIG. 3, FIG. 3 shows an alternative simplified functional block diagram of a wireless communication device 300 according to one embodiment of the present disclosure. As shown in FIG. 3, the wireless communication device 300 can be utilized for realizing the AP 110, the AP 210 and the central server 130 in FIG. 1 and FIG. 2, and the wireless communication device may be used in the LTE system, the LTE-A system or other system which is approximate to the two systems described above. The wireless communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling the operation of the wireless communication device 300. The wireless communication device 300 can receive signals input by a user through the input device 302, such as a keyboard or keypad, and can output images and sounds through the output device 304, such as a monitor or speakers. The transceiver 314 is used to receive and transmit wireless signals wirelessly, deliver received signals to the control circuit 306, and output signals generated by the control circuit 306.

Figure 4:
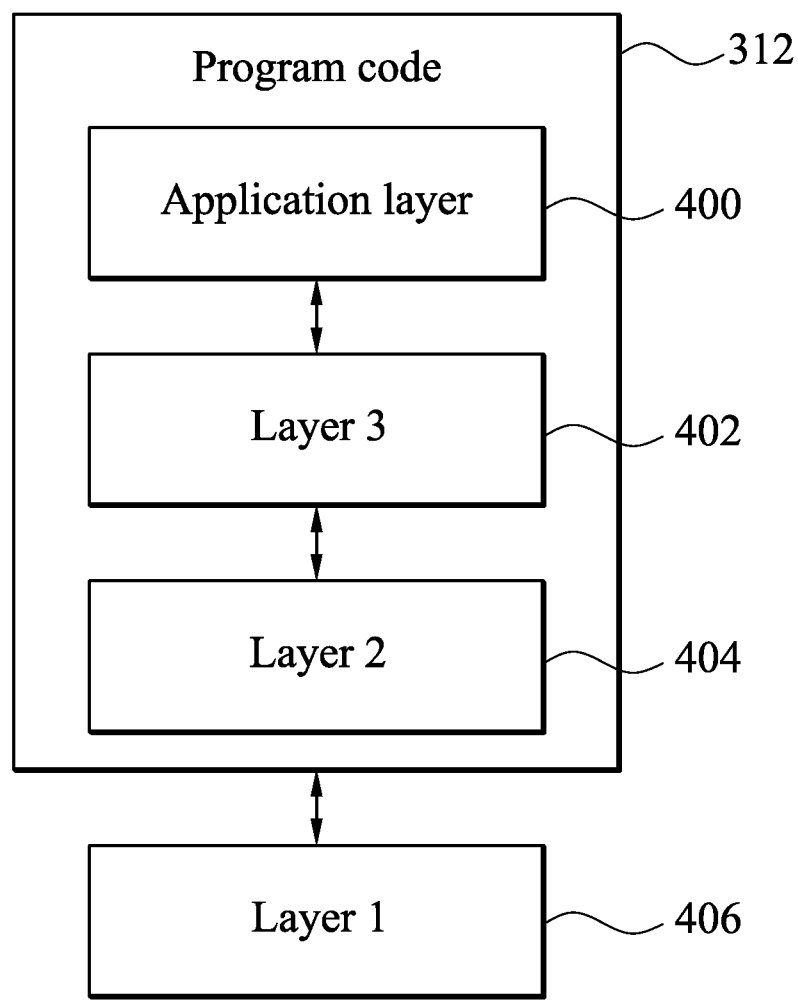
FIG. 4 is a simplified block diagram of the program code shown in FIG. 3 in accordance with one embodiment of the disclosure.

FIG. 4 is a simplified block diagram of the program code 312 shown in FIG. 3 in accordance with one embodiment of the disclosure. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

A calibration method and a wireless communication device for achieving channel reciprocity provided in the disclosure are used to form a tree network topology by the central server according to environment information between APs. The calibration parameters are obtained according to the tree network topology to calibrate the channels between the APs, so as to achieve the purpose that the UEs do not need to feed back information to the APs. The process of forming the network topology will be described in detail below.

It should be noted that, for convenience, each AP with a single antenna in FIG. 1 or each antenna composing the M-MIMO antenna array in FIG. 2 is called a node in the following embodiments. In the following embodiments, the network topology can include a root node and one or more child or descendant nodes arranged in hierarchical levels. A node in the "top" level can be defined as the root node, and nodes in the "bottom" level can be defined as leaf nodes. The root node and the descendent nodes have a parent-child relationship between two nodes hierarchically adjacent. The parent-child relationship defines the connection between a node in the upper level of the tree and the node's direct child nodes.

FIGS. 5A~5H show a process which is how a tree network topology is formed by the APs in accordance with one embodiment of the disclosure. It is assumed that there are 9 nodes distributed in an environment. In the environment of the embodiment, the root node $N_{Root}$ may be randomly selected by the central server or determined according to the number of the UEs connected to the nodes. For example, the node connected to the most UEs connected is selected as the root node.

Before the process, the central server may receive environment information between each of the child nodes $N_1$ to $N_8$ and $N_{Root}$ and between each of the child nodes $N_1$ to $N_8$ and one of the other child nodes transmitted by the root node $N_{Root}$ and the child nodes $N_1$ to $N_8$, wherein the environment information at least comprises transmission power, channel gain, noise variance and a number of pilot signals.

The central server may calculate evaluation parameters between the nodes after receiving the environment information. For example, an evaluation parameter $\Gamma_{i \to j}^2$ between a node i and a node j can be expressed by the following equation:

$$\Gamma_{i \to j}^2 = \left| \frac{1}{p_{i \to j} \cdot b_{i \to j}} \right|^2 \cdot \frac{\sigma_{i \to j}^2}{N}, \quad (1)$$

wherein $p_{i \to j}$ is the transmission power between the node i and the node j, $b_{i \to j}$ is the channel gain between the node i and the node j, $\sigma_{i \to j}^2$ is the noise variance between the node i and the node j and N is the number of pilot signals. In addition, the evaluation parameter $\Gamma_{i \to j}^2$ is equal to the evaluation parameter $\Gamma_{j \to i}^2$.

Figure 5A:
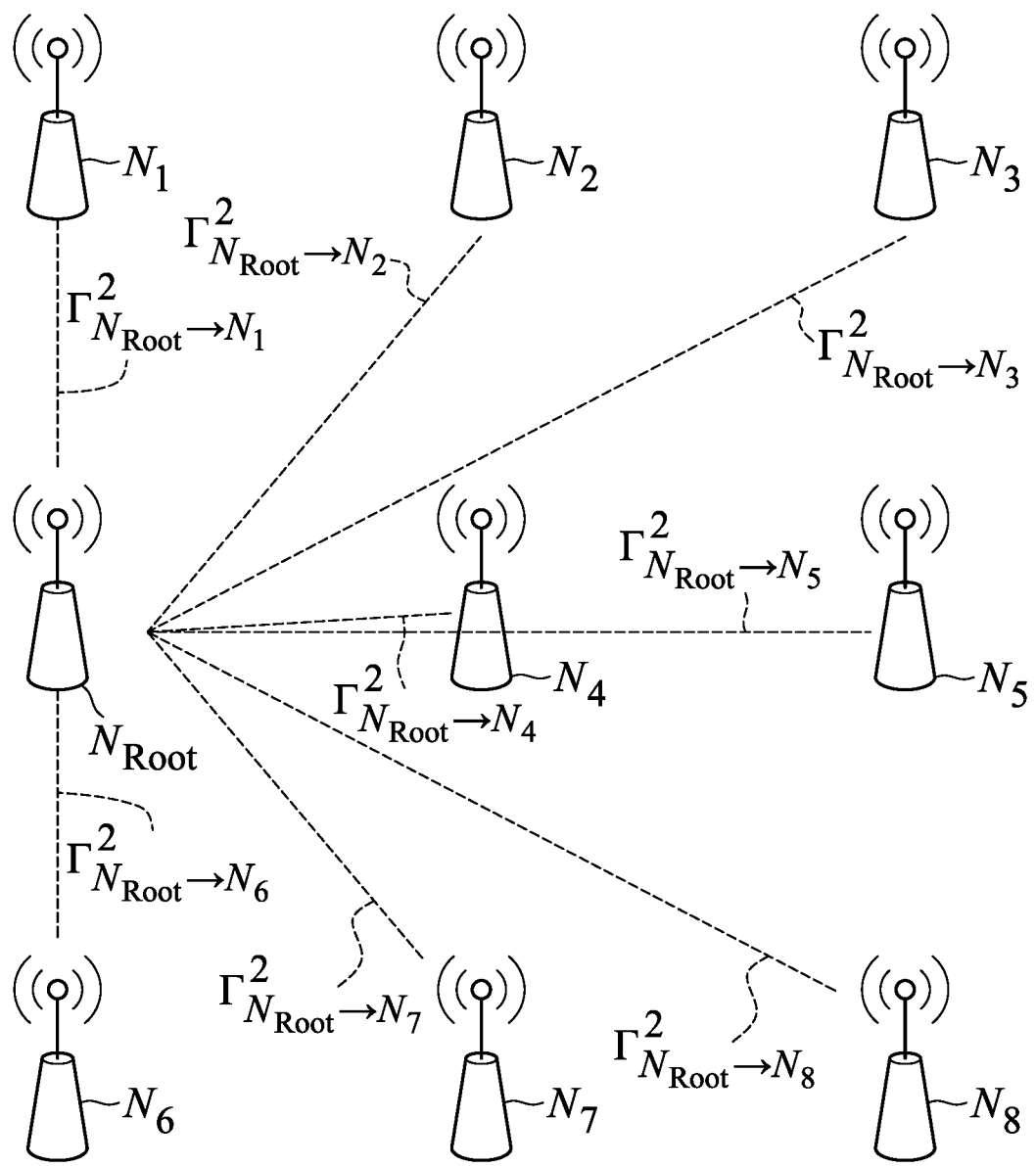
FIGS. 5A~5H show a process which is how a tree network topology is formed by the APs in accordance with one embodiment of the disclosure.
Figure 5B:
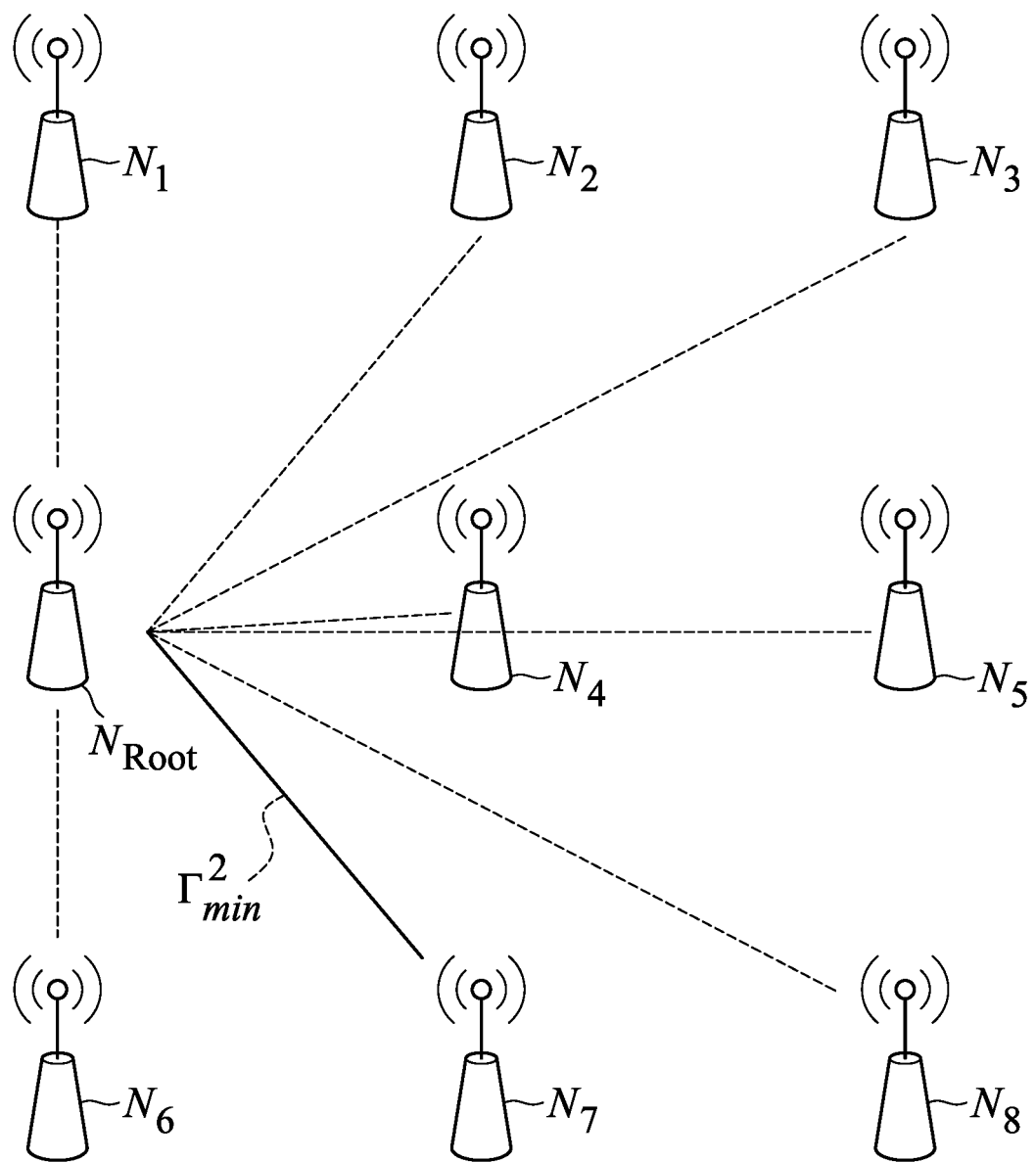
Figure 5C:
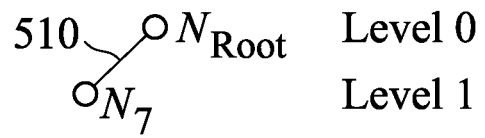
Figure 5C:
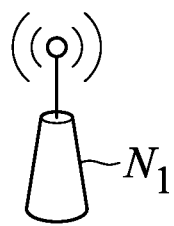
Figure 5C:
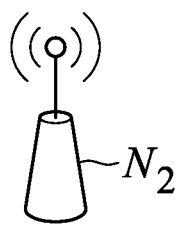
Figure 5C:
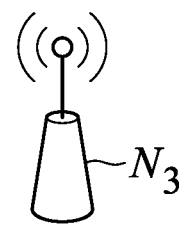
Figure 5C:
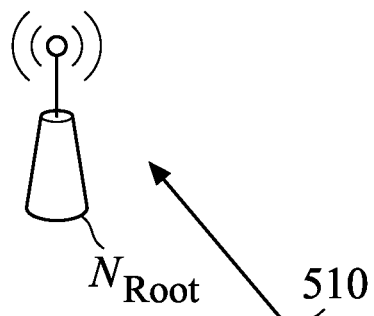
Figure 5C:
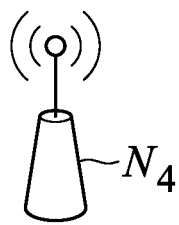
Figure 5C:
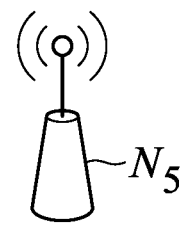
Figure 5C:
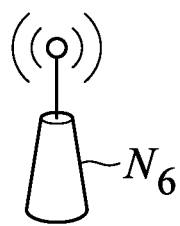
Figure 5C:
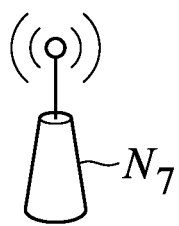
Figure 5C:
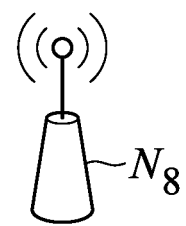

In FIG. 5A, no link has been formed. The central server can obtain the evaluation parameters between each of the child nodes $N_1$ to $N_8$ and the root node $N_{Root}$. Next, in FIG. 5B, the central server selects a node pair (the root node $N_{Root}$ and the child node $N_7$) with the minimum evaluation parameter $\sigma_{min}^2$. In FIG. 5C, the central server forms a link 510 corresponding to the node pair.

Figure 5D:
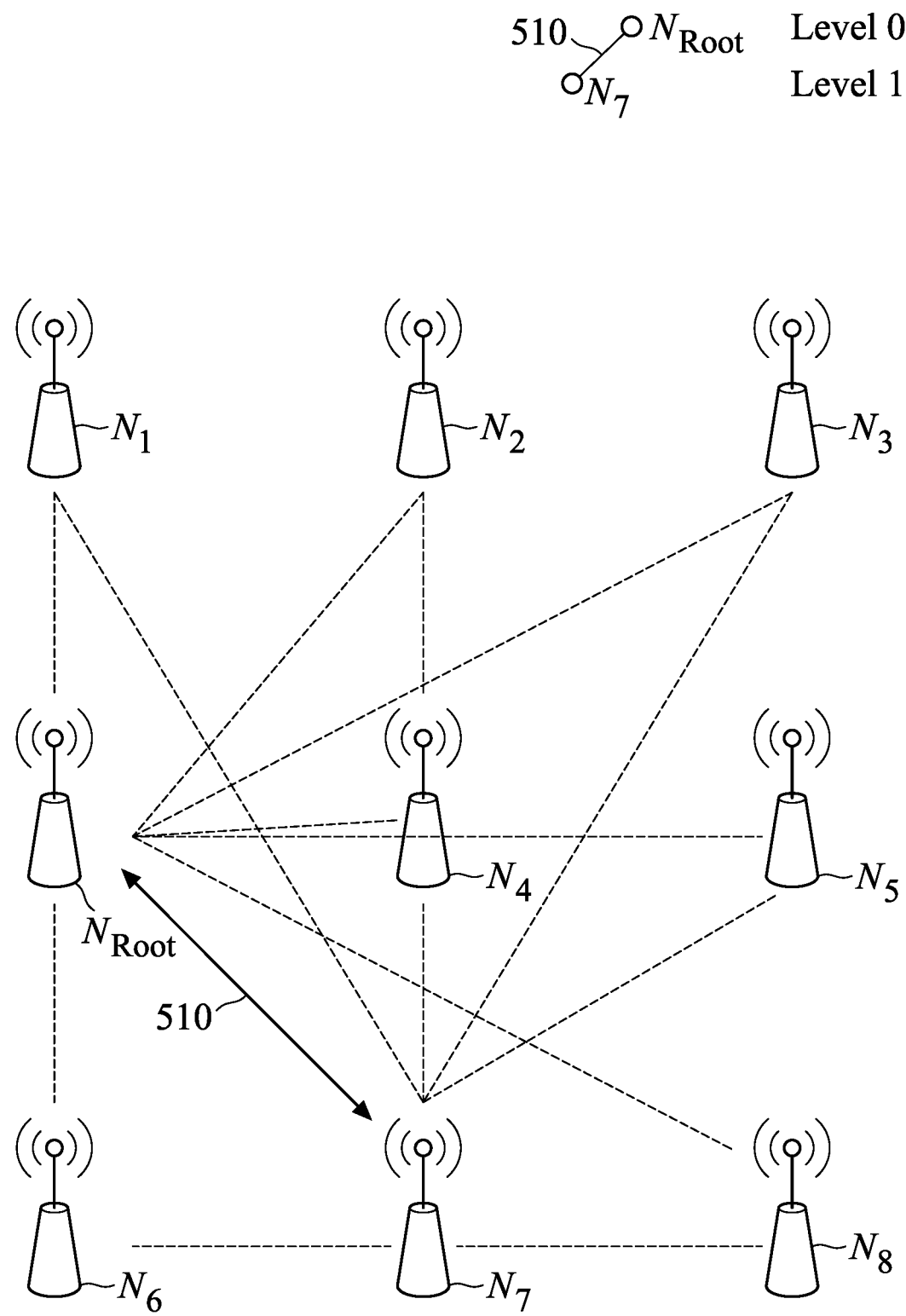

In FIG. 5D, the link 510 has been formed. The central server obtains the evaluation parameters between each of the child nodes $N_1$ to $N_6$ and $N_8$ not forming a link and the root node $N_{Root}$ and accumulated evaluation parameters between the node 510 and the root node $N_{Root}$ via the link 510. The accumulated evaluation parameter $\tilde{\Gamma}_{N_i}^2$ between a $N_i$ and $N_{Root}$ can be expressed by the following equation:

$$\tilde{\Gamma}_{N_i}^2 = \mathcal{G}(\Gamma_{s_{n-1}\to N_i}^2, \mathcal{G}(\ldots, \mathcal{G}(\Gamma_{s_1\to s_2}^2, \Gamma_{N_{Root}\to s_1}^2))) \quad (2)$$

where $s_k$ represents the kth node from the root node $N_{Root}$ to the child node $N_i$, and the child node $N_i$ is the nth node. The equation $\mathcal{G}$ is defined as follows:

$$\mathcal{G}(a,b) = a + b + a*b \quad (3)$$

wherein a and b are constants. In other words, $\tilde{\Gamma}_{N_i}^2$ represents the accumulated evaluation parameter consisted of all the evaluation parameters corresponding to the links from the root node $N_{Root}$ to the child node $N_i$ through equation $\mathcal{G}$.

Therefore, in FIG. 5D, the central server further calculates the accumulated evaluation parameters between each of the remaining child nodes ($N_1$ to $N_6$ and $N_8$) and the root node $N_{Root}$ via the link 510 except for the node $N_7$ that has formed the link 510. For example, for the child node $N_8$, the central server further calculates the accumulated evaluation parameter $\tilde{\Gamma}_{N_8}^2$ between the child node $N_8$ and the root node $N_{Root}$ via the link 510 in addition to calculating the evaluation parameter between the child node $N_8$ and the root node $N_{Root}$. In other words, the accumulated evaluation parameter $\tilde{\Gamma}_{N_8}^2$ can be expressed by the following equation:

$$\tilde{\Gamma}_{N_8}^2(\Gamma_{N_7\to N_8}^2, \Gamma_{N_{Root}\to N_7}^2)$$

Figure 5E:
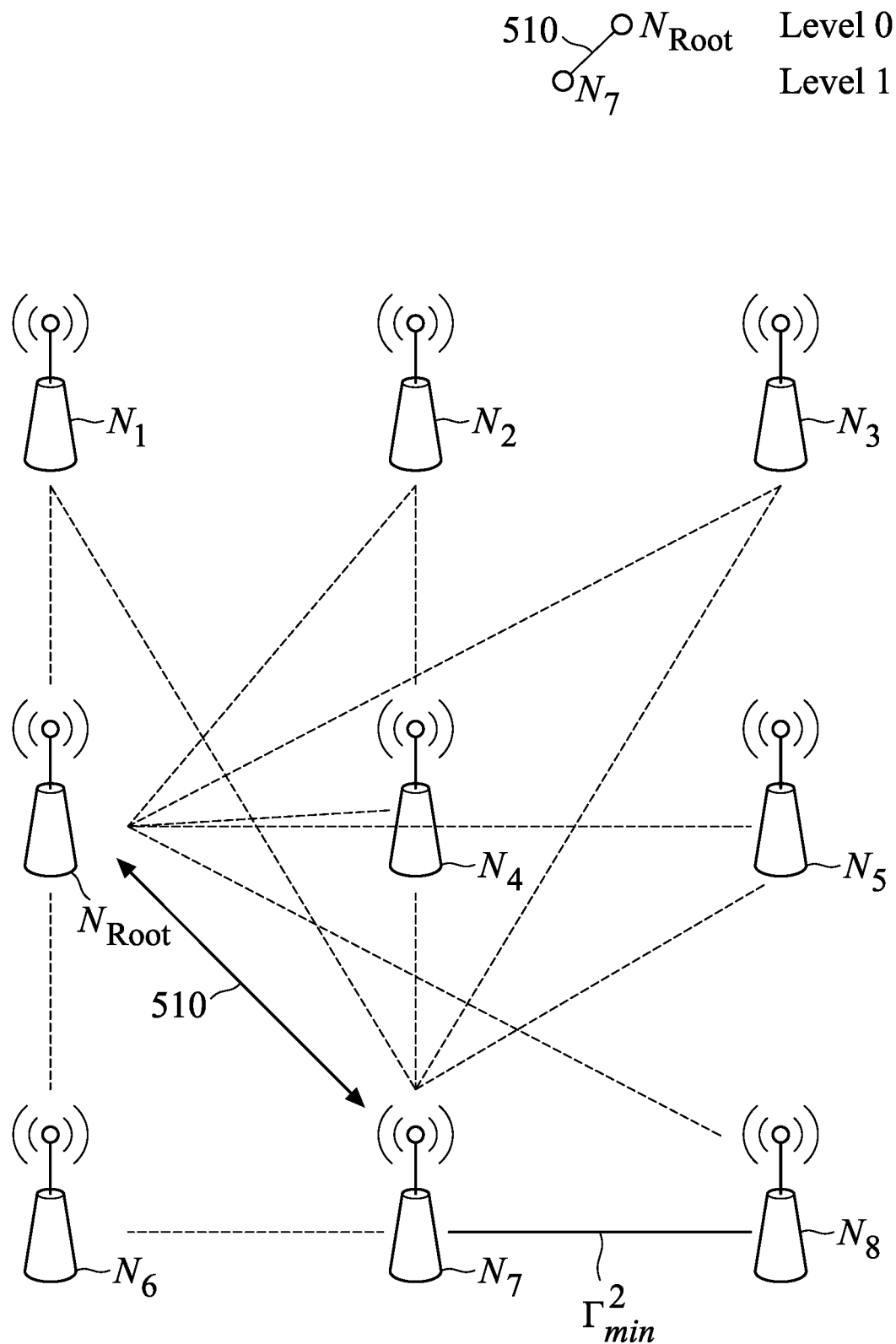
Figure 5F:
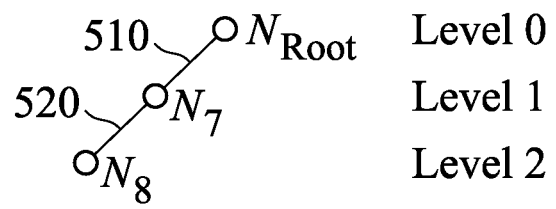
Figure 5F:
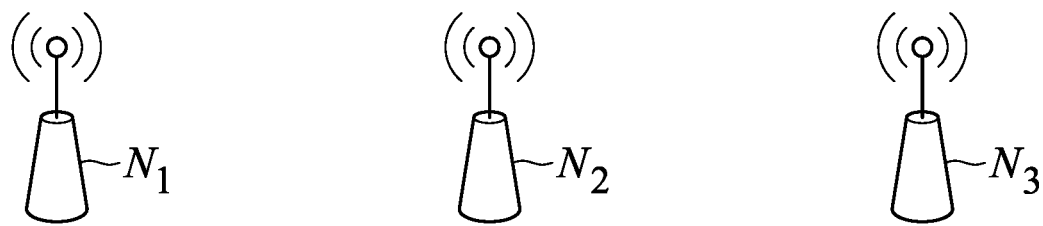
Figure 5F:
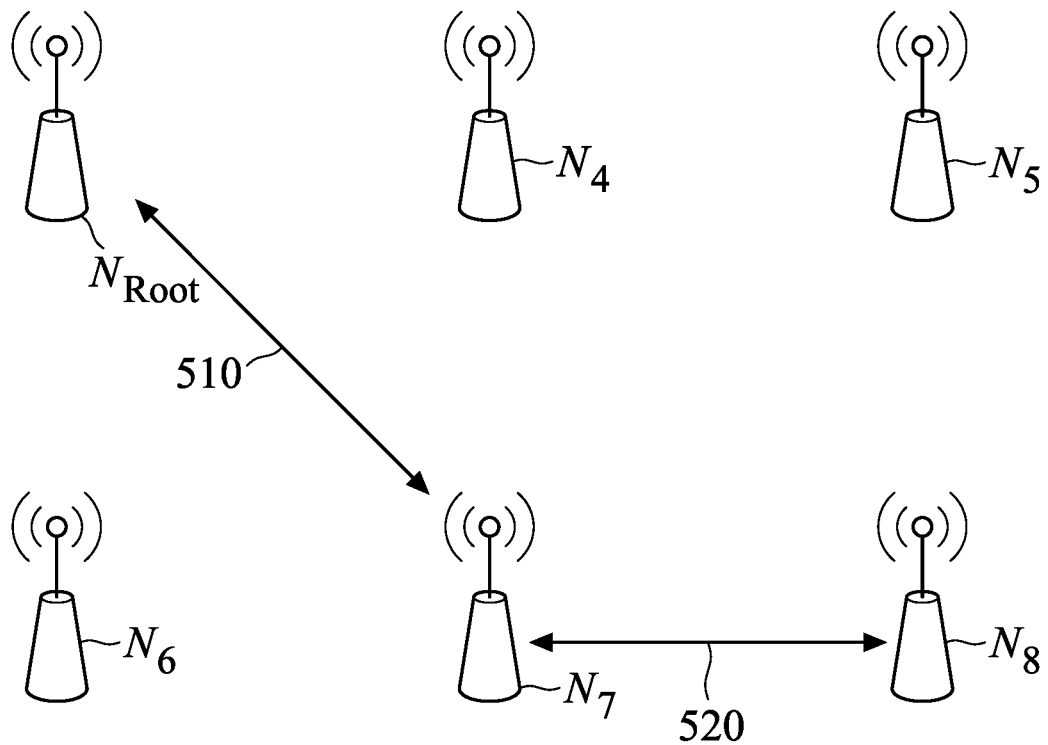

Next, in FIG. 5E, the central server selects a node pair (the child node $N_7$ and the child node $N_8$) with the minimum evaluation parameter $\Gamma_{min}^2$ among the evaluation parameters and the accumulated evaluation parameters. In FIG. 5F, the central server forms a link 520 corresponding to the node pair.

Figure 5G:
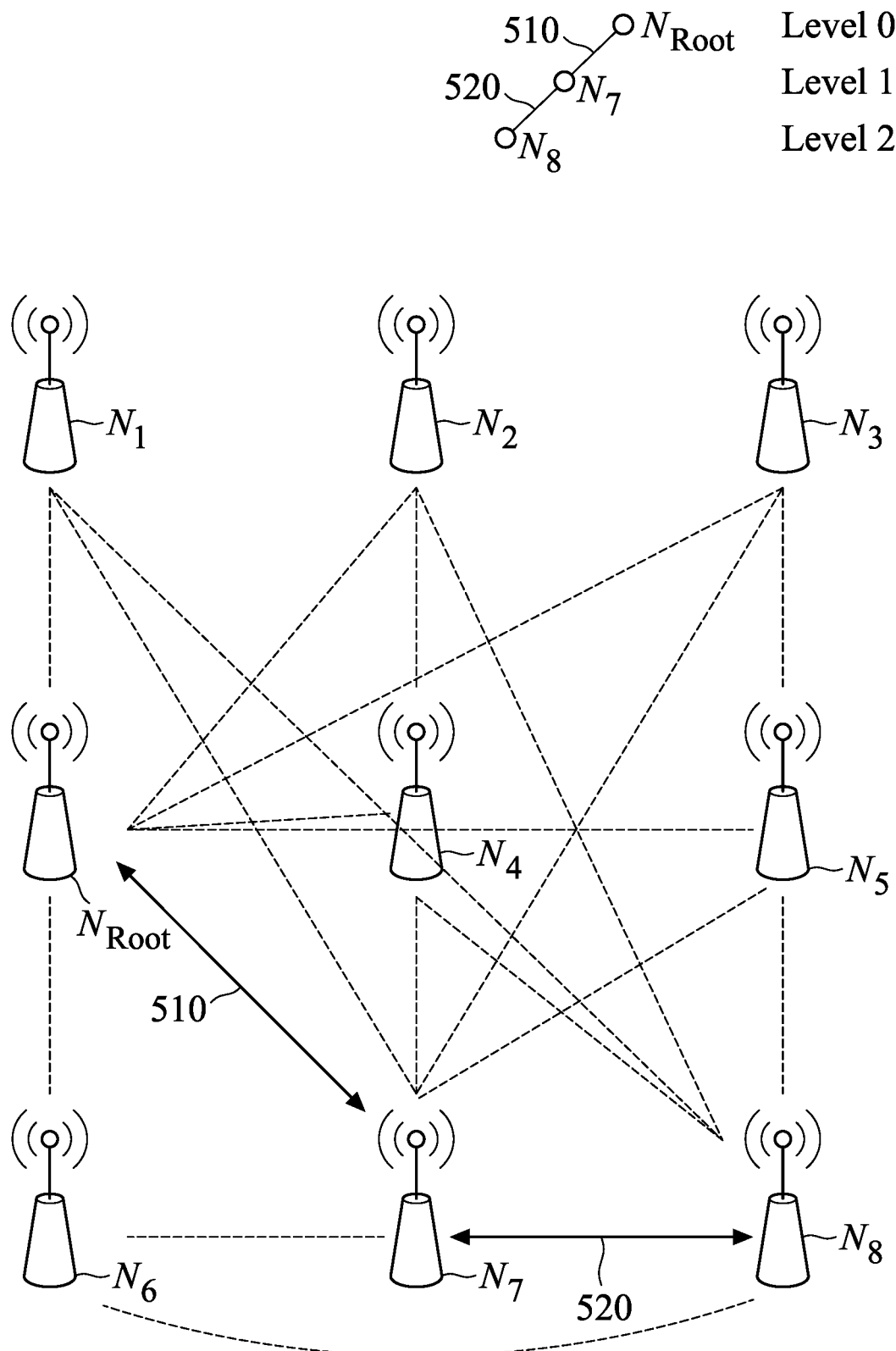

In FIG. 5G, the central server continues to calculate the evaluation parameters between each of the remaining child nodes $N_1$ to $N_6$ and the root node $N_{Root}$ except for the nodes $N_7$ and $N_8$ that have formed the links 510 and 520, calculates the accumulated evaluation parameters between each of the remaining child nodes $N_1$ to $N_6$ and the root node $N_{Root}$ via the links 510 and 520, and selects a node pair with the minimum evaluation parameter to form a link.

Figure 5H:
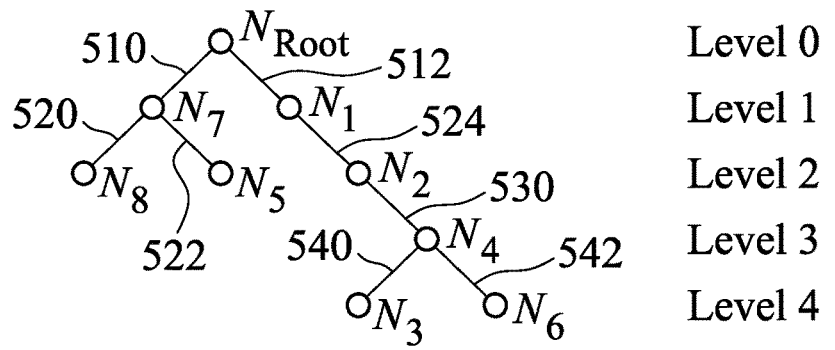
Figure 5H:
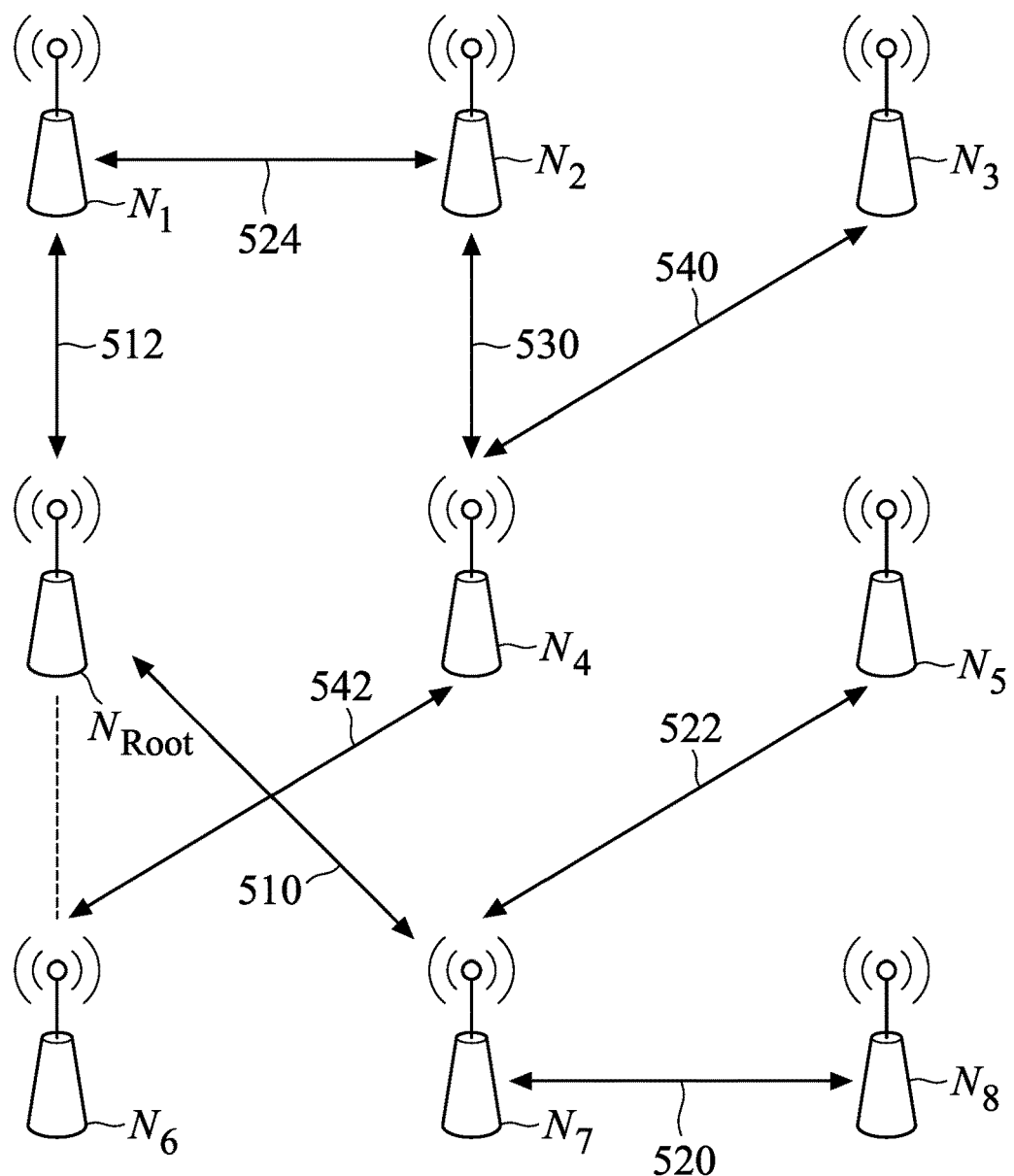

The central server continues to repeatedly perform the steps until each of the child nodes forms a link with the root node $N_{Root}$ or one of the child nodes $N_1$ to $N_8$. As shown in FIG. 5H, a tree network topology of the root node $N_{Root}$ and the child nodes $N_1$ to $N_8$ has been formed. The central server can obtain calibration parameters according to the tree network topology to calibrate the reciprocity of the root node $N_{Root}$ and the child nodes $N_1$ to $N_8$.

Obviously, through the process described above, the central server merely needs to determine the root node $N_{Root}$, and then performs the step of selecting the node pair with the minimum evaluation parameter eight times to obtain the tree network topology of the nodes. In addition, the level of each child node can be known according to the tree network topology.

Figure 6:
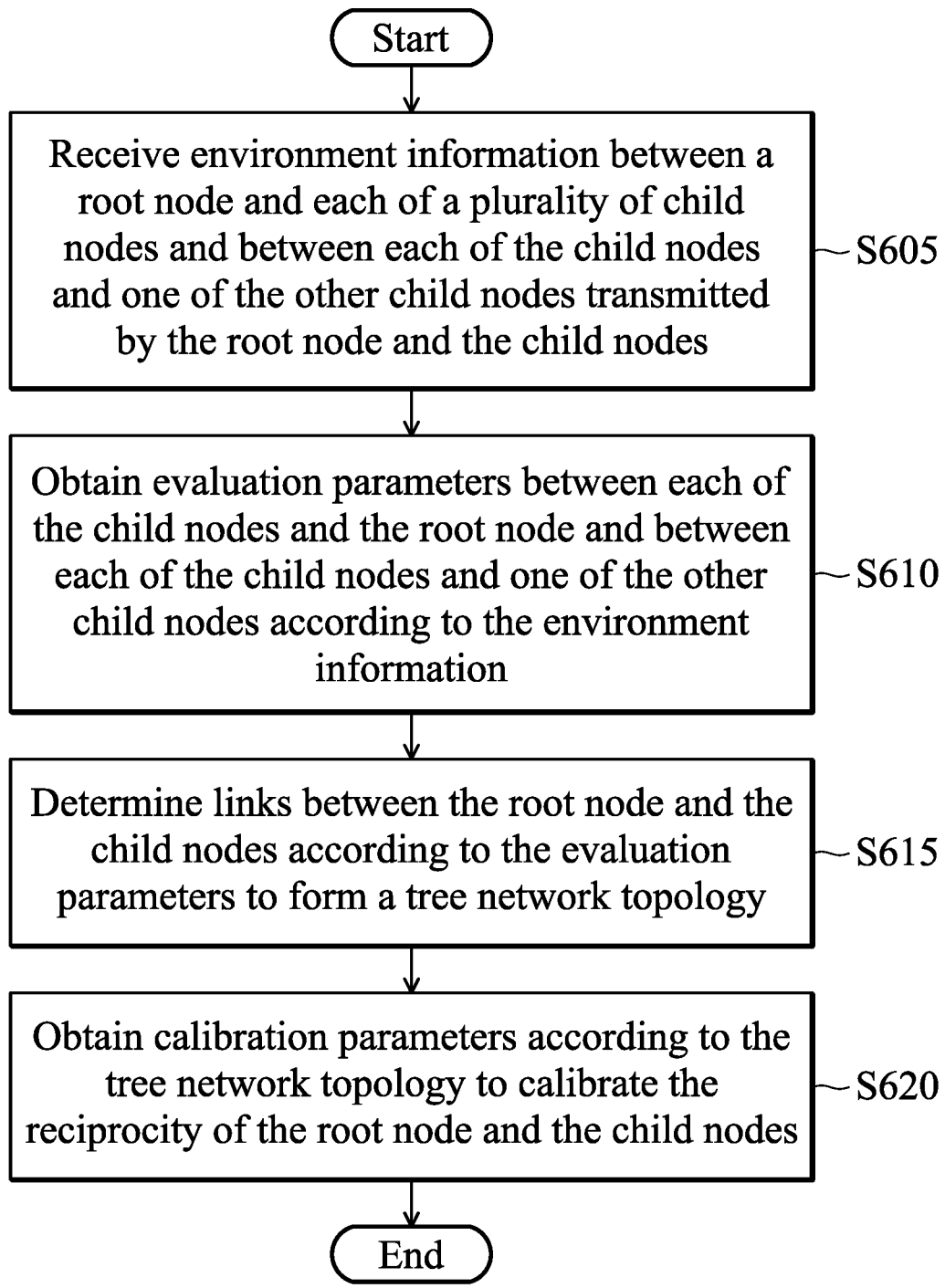
FIG. 6 is a flow diagram illustrating a calibration method for achieving channel reciprocity according to an embodiment of the present disclosure.

FIG. 6 is a flow diagram illustrating a calibration method for achieving channel reciprocity according to an embodiment of the present disclosure. The method may be used in the central server 130 or one of the APs 110 of FIG. 1 to form the tree network topology of the nodes.

In step 605, the central server receives environment information between a root node and each of a plurality of child nodes and between each of the child nodes and one of the other child nodes transmitted by the root node and the child nodes, wherein the environment information at least comprises transmission power, channel gain, noise variance and a number of pilot signals. In step S610, the central server obtains evaluation parameters between each of the child nodes and the root node and between each of the child nodes and one of the other child nodes according to the environment information.

Next, in step S615, the central server determines links between the root node and the child nodes according to the evaluation parameters to form a tree network topology. In step S620, the central server obtains calibration parameters according to the tree network topology to calibrate reciprocity of the root node and the child nodes.

In an embodiment, the root node and the child nodes support multiuser multiple input multiple output (MU-MIMO) communication, and the root node and the child nodes are APs.

In another embodiment, the root node and the child nodes are antennas of an AP supporting massive multiple input multiple output (M-MIMO) communication.

Referring back to FIG. 3 and FIG. 4, the wireless communication device 300 comprises a program code 312 stored in the memory 310. In an embodiment, the CPU 308 may execute the program code 312 to perform one or more of the following steps: (i) receiving environment information between a root node and each of a plurality of child nodes and between each of the child nodes and one of the other child nodes transmitted by the root node and the child nodes; (ii) obtaining evaluation parameters between each of the child nodes and the root node and between each of the child nodes and one of the other child nodes according to the environment information; (iii) determining links between the root node and the child nodes according to the evaluation parameters to form a tree network topology; and (iv) obtaining calibration parameters according to the tree network topology to calibrate the reciprocity of the root node and the child nodes.

Figure 7A:
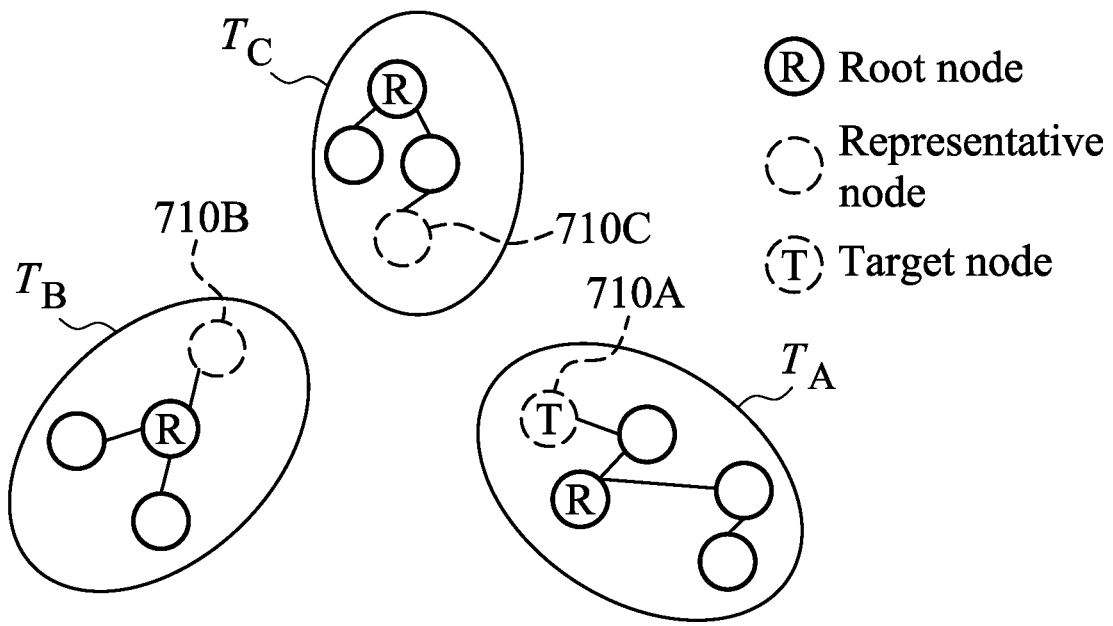
FIGS. 7A~7B show a process of forming an extended tree network topology according to a plurality of tree network topologies according to an embodiment of the present disclosure.
Figure 7B:
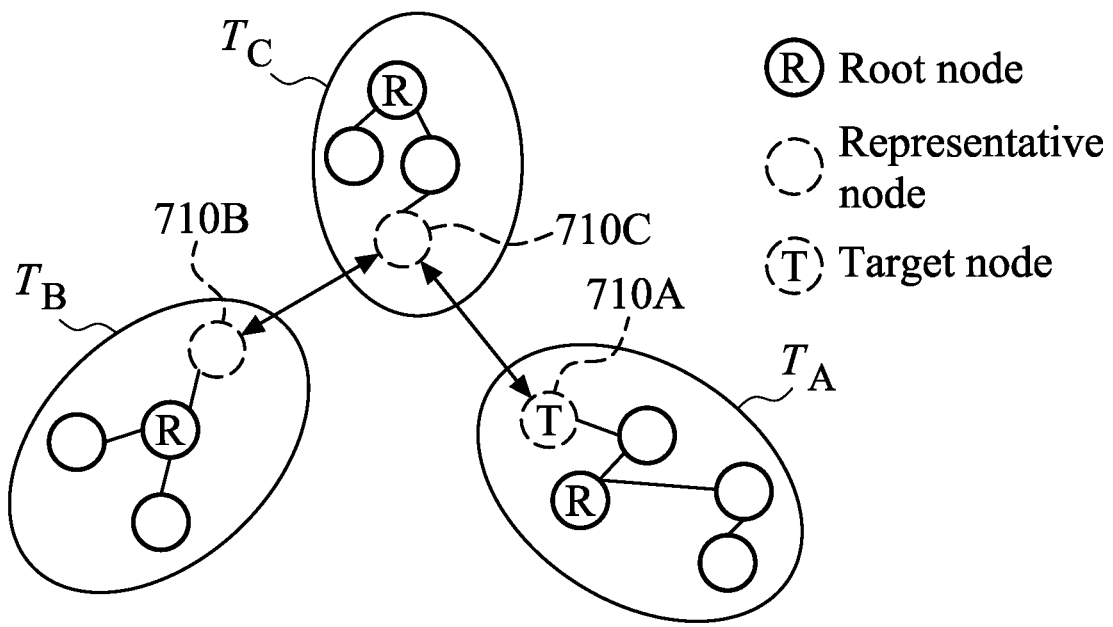

FIGS. 7A~7B show a process of forming an extended tree network topology according to a plurality of tree network topologies according to an embodiment of the present disclosure. As shown in FIG. 7A, it is assumed that three tree network topologies ($T_A$, $T_B$ and $T_C$) have been formed and each of the tree network topologies has its own root node R. The central server may randomly select one node from the nodes in each of the tree network topologies as a representative node of each tree network topology. As shown in FIGS. 7A and 7B, the representative nodes 710A, 710B and 710C of the tree network topologies $T_A$, $T_B$ and $T_C$ are indicated by dashed lines, respectively.

The central server then randomly selects a representative node from the representative nodes 710A, 710B and 710C as a target node T. It is assumed that the representative node 710A of the tree network topology $T_A$ is selected as the target node T (it means the target node T is used as a root node among the representative nodes 710A, 710B, and 710C). The central server may receive environment information between each of the representative nodes and the target node T and between each of the representative nodes and one of the other representative nodes transmitted by the target node T and the representative nodes 710B and 710C.

The central server may calculate the evaluation parameters between the nodes by using the equation (1) after receiving the environment information and determines the links between the target node T and the representative nodes 710B and 710C according to the process of forming the tree network topology in FIG. 5A to FIG. 5H to form an extended tree network topology, as shown in FIG. 7B.

In addition, the CPU 308 could execute the program code 312 to perform all of the above-described actions and steps or others described herein.

As shown above, the calibration parameters can be obtained according to paired information observed by selected pairs through the tree network topology formed by the selected node pairs in the disclosure. Since the environment parameters further are taken into consideration in the present disclosure, selecting inferior node pairs can be avoided and problems that cannot be solved by existing solutions can be solved. Furthermore, in addition to excellent performance, the suitable node pairs can still be found by using the calibration method and the wireless communication device for achieving the channel reciprocity proposed in the present disclosure even though the environment parameters change. The suitable node pairs may perform information exchange between the nodes to calculate the calibration parameters, so that interference from the downlink signal is minimized.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosure has been described by way of example and in terms of exemplary embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A calibration method for achieving channel reciprocity, used in a wireless communication device, comprising:
receiving environment information between a root access point (AP) and each of a plurality of child APs and between each of the child APs and one of the other child APs transmitted by the root AP and the child APs;
obtaining evaluation parameters between each of the child APs and the root AP and between each of the child APs and one of the other child APs according to the environment information, wherein the evaluation parameters relate to transmission power and channel gain between the root node AP and the child nodes APs;

selecting AP pairs between the root AP and the child APs according to the evaluation parameters to form links corresponding to the AP pairs which are selected so as to form a first tree network topology; and obtaining calibration parameters of the AP pairs selected through the first tree network topology to calibrate reciprocity of the root AP and the child APs;

wherein the evaluation parameter $\Gamma_{i \rightarrow j}^2$ between an AP i and an AP j is expressed by the following equation:

$$\Gamma_{i \rightarrow j}^2 = \left| \frac{1}{p_{i \rightarrow j} \cdot b_{i \rightarrow j}} \right|^2 \cdot \frac{\sigma_{i \rightarrow j}^2}{N},$$

wherein $p_{i \rightarrow j}$ is the transmission power between the AP i and the AP j, $b_{i \rightarrow j}$ is the channel gain between the AP i and the AP j, $\sigma_{i \rightarrow j}^2$ is the noise variance between the AP i and the AP j and N is the number of pilot signals.

2. The calibration method for achieving channel reciprocity as claimed in claim 1, wherein the environment information at least comprises: the transmission power, the channel gain, noise variance and a number of pilot signals.

3. The calibration method for achieving channel reciprocity as claimed in claim 1, wherein the step of selecting AP pairs between the root AP and the child APs according to the evaluation parameters to form links corresponding to the AP pairs which are selected so as to form the first tree network topology further comprises:
   (a) obtaining the evaluation parameters between each of the child APs-and the root AP when no link is formed, and selecting a AP pair having a minimum evaluation parameter to form a link; and
   (b) when a link has been formed, obtaining the evaluation parameters between each child AP not forming the link and the root AP and accumulated evaluation parameters passing through the link between each child AP not forming the link and the root AP, and selecting a AP pair with the minimum evaluation parameter from the evaluation parameters and the accumulated evaluation parameters to form a link; the step (B) is repeatedly performed until each of the child APs forms the link with the root AP or one of the child APs.

4. The calibration method for achieving channel reciprocity as claimed in claim 1, wherein the root AP and the child APs support multiuser multiple input multiple output (MU-MIMO) communication.

5. The calibration method for achieving channel reciprocity as claimed in claim 1, wherein the root AP and the child APs support massive multiple input multiple output (M-MIMO) communication.

6. The calibration method for achieving channel reciprocity as claimed in claim 1, wherein the wireless communication device is one of the root AP and the child APs.

7. The calibration method for achieving channel reciprocity as claimed in claim 1, further comprising:
   selecting either the root AP or one of the child APs as a first representative AP of the first tree network topology; and
   determining links between the first representative AP and a second representative AP according to the environment information and the evaluation parameters between the first representative AP and the second representative AP of at least one second tree network topology to form an extension tree network topology.

8. A wireless communication device for achieving channel reciprocity, comprising:
   a control circuit;
   a processor installed in the control circuit; and
   a memory installed in the control circuit and operatively coupled to the processor;
   wherein the processor is configured to execute program codes stored in the memory to:
   receive environment information between a root access point (AP) and each of a plurality of child APs and between each of the child APs and one of the other child APs transmitted by the root AP and the child APs;
   obtain evaluation parameters between each of the child APs and the root AP and between each of the child APs and one of the other child APs according to the environment information, wherein the evaluation parameters relate to transmission power and channel gain between the root node AP and the child nodes APs;
   select AP pairs between the root AP and the child APs according to the evaluation parameters to form links corresponding to the AP pairs which are selected so as to form a first tree network topology; and
   obtain calibration parameters of the AP pairs selected through the first tree network topology to calibrate reciprocity of the root AP and the child APs;
   wherein the evaluation parameter $\Gamma_{i \rightarrow j}^2$ between an AP i and an AP j is expressed by the following equation:

$$\Gamma_{i \rightarrow j}^2 = \left| \frac{1}{p_{i \rightarrow j} \cdot b_{i \rightarrow j}} \right|^2 \cdot \frac{\sigma_{i \rightarrow j}^2}{N},$$

wherein $p_{i \rightarrow j}$ is the transmission power between the AP i and the AP j, $b_{i \rightarrow j}$ is the channel gain between the AP i and the AP j, is the noise variance between the AP i and the AP j and N is the number of pilot signals.

9. The wireless communication device as claimed in claim 8, wherein the environment information at least comprises: the transmission power, the channel gain, noise variance and a number of pilot signals.

10. The wireless communication device as claimed in claim 8, wherein selecting AP pairs between the root AP and the child APs according to the evaluation parameters to form links corresponding to the AP pairs which are selected so as to form the first tree network topology by the processor further comprises:
   (a) obtaining the evaluation parameters between each of the child APs-and the root AP when no link is formed, and selecting a AP pair having a minimum evaluation parameter to form a link; and
   (b) when a link has been formed, obtaining the evaluation parameters between each child AP not forming the link and the root AP and accumulated evaluation parameters passing through the link between each child AP not forming the link and the root AP, and selecting a AP pair with the minimum evaluation parameter from the evaluation parameters and the accumulated evaluation parameters to form a link; the step (B) is repeatedly performed until each of the child APs forms the link with the root AP or one of the child APs.

11. The wireless communication device as claimed in claim 8, wherein the root AP and the child APs support multiuser multiple input multiple output (MU-MIMO) communication.

12. The wireless communication device as claimed in claim 8, wherein the root AP and the child APs support massive multiple input multiple output (M-MIMO) communication.

13. The wireless communication device as claimed in claim 8, wherein the wireless communication device is one of the root AP and the child APs.

14. The wireless communication device as claimed in claim 8, wherein the processor further executes the program codes stored in the memory to:
    select either the root AP or one of the child APs as a first representative AP of the first tree network topology; and
    determine links between the first representative AP and a second representative AP according to the environment information and the evaluation parameters between the first representative AP and the second representative AP of at least one second tree network topology to form an extension tree network topology.

* * * * *